Patented Oct. 20, 1953

2,656,324

UNITED STATES PATENT OFFICE 2,656,324

METHOD OF MAKING RUBBERY COMPOUNDS SUITABLE FOR PRODUCTION OF TIRE TREADS

Theodore A. Te Grotenhuis, Olmsted Falls, Ohio

No Drawing. Application July 4, 1945,
Serial No. 603,256

4 Claims. (Cl. 260—5)

This invention is a continuation-in-part of my prior applications Serial No. 559,848 filed October 21, 1944, now Patent 2,457,097, which is a continuation-in-part of application Serial No. 424,493 filed December 16, 1941, and now abandoned. The invention relates to pneumatic tires having wear-resistant treads, compounds for preparing such wear-resistant treads and to a method of making such compounds.

Since the first use of carbon black as a compounding agent for rubber, the quantity added to tread rubber compounds steadily increased to provide improved abrasion resistance until it was found that flexing or crack-resistant properties were adversely affected. Present day rubber compounds and tire treads represent a balance between relatively mediocre abrasion resistance and mediocre flexing or resistance to heat build-up by flexing. With the advent of synthetic polymerizable materials, it has often been found that one rubbery polymer may, particularly in the relatively broken-down state, have exceptionally high abrasion resistance when it is compounded with sufficient amounts of carbon black, yet it may crack badly and have very poor flexing properties. Another rubbery polymer may have exceptional anti-cracking and flexing properties and yet have relatively mediocre abrasion resistance. When blends of rubbery materials are made in accordance with well-recognized fundamentals of the tire industry, the homogeneous mixture is usually obtained at a substantial sacrifice of properties desired in the polymers.

It is an object of the present invention to provide a tire tread which may be compounded to provide optimum flexing properties and also optimum abrasion resistance.

It is another object of the present invention to provide a method of making tire treads wherein the advantages of two different types of rubbers or rubber compounds containing carbon black may be retained.

It is another object of the present invention to provide a vulcanizable rubberlike material characteristic of vulcanizable rubber and containing dispersed vulcanizable rubber or synthetic rubbery compound which when vulcanized has abrasion resistance superior to that of the matrix compound, which is also vulcanizable to a resilient material characteristic of soft rubber.

In the preparation of molded rubber articles such as tire treads and the like, it has heretofore been necessary to break down or highly plasticize rubber compounds in order that they will process or tube in a desirable manner to form a smooth surface. Such break-down or mastication, as is well-known, causes great loss of some of the most desirable properties of the rubbers or rubbery polymers. Abrasion resistance, for example, may be reduced by mastication as much as 40% or 50% of that inherent in the unmasticated or slightly masticated materials.

It is still another object of the present invention to provide a rubberlike compound wherein all of the rubbery material therein need not be broken down to increase processability so that it can be formed in the desired shape.

It is a primary object of the present invention to provide a compound suitable for tire treads which may be formed in the desired shape, which is vulcanizable to provide resilience similar to that of vulcanized rubber and which retains the advantageous properties of rubber or a rubbery polymer which has not been appreciably deteriorated by mastication.

These and other objects are accomplished by mixing two separately prepared rubber compounds, one compounded to provide high abrasion resistance and the other compounded to provide superior flexing properties in such a way as to produce a heterogeneous compound having particles of the relatively high abrasion-resistant polymer as a disperse phase and having the relatively elastic flexible rubbery polymer as a matrix or connecting ingredient.

The rubbery compounds of the present invention are preferably formed by separately preparing the compounds intended respectively for disperse and continuous phases. The compound intended as the matrix should be substantially less plastic then the compound intended as the disperse phase. The plasticity may be measured with the recognized Mooney shearing disc plastometer or with an extrusion plastometer, such as a Dillon-Johnston plastometer, manufactured by The Firestone Tire & Rubber Company. A difference in plasticity between the two rubber compounds of at least ten points, and preferably substantially twenty or thirty points or more on a Mooney plastometer, is desirable. The "Mooney plastometer" is described in an article entitled "A shearing disc plastometer for unvulcanized rubber" by Melvin Mooney, published in Industrial and Engineering Chemistry, Anal. Ed., 6, 147 (1934). The measurement of plasticity or plasticity standards are also described in the "Government Specification for Synthetic Rubbers," July 1945.

In contradistinction from a fundamental rule of rubber compounders, namely, that in the mixing of two rubber stocks or compounds, the softer stock must be added to the harder stock—my heterogeneous compounds are prepared by adding the harder stock a little at a time to the softer stock, preferably while the latter is being masticated on a rubber mill or its equivalent. When mastication is on a rubber mill the softer compound should at least form a band around the rolls before the harder compound is added. It is important that the harder compound be added in relatively small amounts, for example, in ribbon form, or in the form of a powder or crumb, etc., and be masticated in the softer rubber compound at such a rate that it does not tend to agglomerate and form a continuous phase. Addition of a single large mass of the harder compound frequently tends to displace the softer compound from the mill so that upon continued mixing all the advantages of the present invention are not usually obtained.

The rubber compound used as the disperse phase is especially desirable in the form of a rubbery powder or powdered or crumblike polymer containing carbon black and preferably the desired curing or compounding agents. The compound of the disperse phase is preferably prepared without any appreciable mastication, for example, by addition of the carbon black as a dispersion or slurry to a latex of the desired rubber; mastication after drying is especially undesirable. The powder may have some slight setup or cure to increase rigidity, although such tends to decrease the cracking resistance and a powder anywhere nearly completely cured is much less desirable as a disperse phase for the reason that there is substantially no blending of the two materials so that an abrupt interface is formed, with the result that the two compounds may be more readily separated by repeated flexing.

In my prior application Serial No. 559,848, there is pointed out a method of making a heterogeneous compound directly from latices. A rubber crumb, compounded with a relatively large amount of carbon black to obtain great stiffness and low plasticity, or having a relatively low plasticity (high Mooney reading) due to the properties of the rubbery material, may be incorporated with or without first drying within a latex of another compounded latex adapted to produce upon coagulation a rubber of much lower plasticity. The heterogeneous compound is produced upon extrusion or shear of the coagulum of the compounded latex containing the dried crumb of higher carbon black content.

In accordance with the present invention, it is found that an especially desirable tire tread is produced when the heterogeneous compound contains different types of carbon black within the disperse and matrix phases, particularly (but not necessarily) when the compound of the disperse phase also contains a larger quantity of carbon black than the compound of the matrix or continuous phase. Preferably, the carbon black or the mixture of carbon blacks in the disperse phase is also in accordance with the present invention of a type and quantity which has greater stiffening action on rubber, such as smoked sheet, or on rubber compounds than has the carbon black of the matrix composition. Channel black is most desirable for the disperse phase.

The relative stiffening action of blacks depends on the type of black, the loading, and sometimes upon the type of rubbery material within which it is dispersed. In general purpose rubbers, such as Hevea, GR–S, etc., the various kinds of carbon black may ordinarily be rated in decreasing order of stiffness of the mix as conductive channel, medium processing channel, easy processing channel, high modulus furnace, semi-reinforcing furnace, furnace thermal, etc., although at some loadings a reversal of order between high modulus furnace and semi-reinforcing furnace blacks may occur.

Channel black is found to increase the stiffness and plasticity of the rubber compound but when present in large amounts decreases crack resistance. It is, therefore, highly desirable as a disperse phase where the abrasion resistance may be fully utilized.

The matrix composition preferably contains a substantial amount of a carbon black having less stiffening action on the rubber mix than has the carbon black of the disperse phase. When the disperse phase contains a substantial amount of channel black, the carbon black in the matrix composition is preferably largely a furnace black, such as a high modulus furnace black, a semi-reinforced black, or a thermo carbon black.

The disperse phase of rubberlike material as well as the matrix of the plastic compositions of the present invention may be any material or materials which after vulcanization (preferably by sulfur or equivalent vulcanizing agent) have resilience and resistance to plastic flow generally characteristic of soft vulcanized rubbers. But, preferably, rubberlike materials reinforced by carbon black when masticated therein should be used. Other elastomers, particularly sulfur-vulcanizable synthetic elastomers and other vulcanizable elastomers, are defined in the article by H. L. Fisher, entitled "Nomenclature of synthetic rubbers," vol. 100, No. 6, India Rubber World, September 1939, as well as the natural rubber may also be used in the preparation of the matrix and the disperse phase. These synthetic rubbers may be polymers of one or more of butadiene or butadiene compounds, such as butadiene-1,3, isoprene, haloprenes such as chloroprene (chlor-2-butadiene-1,3), 2,3-dichlorobutadiene-1,3, dimethyl butadiene, cyano-2-butadiene-1,3, and other materials containing conjugated, unsaturated linkages such as double bonds and preferably having four to seven or eight carbon atoms.

I usually prefer, however, especially for the disperse phase, the so-called Buna rubber or copolymers of a major proportion of one or more such conjugated dienes, particularly butadiene and/or isoprene, with a minor proportion of one or more other polymerizable unsaturated materials, especially those containing an aliphatic olefin group (a $>C=C<$ group) preferably having at least one of the free valence bonds directly linked to an activating or polar group, such as a double bonded carbon or nitrile group, etc., including aryl vinyl compounds such as styrene, alpha-alkyl styrenes, halogen-substituted aryl vinyl compounds such as mono-, di-, and trichlor-substituted styrenes having chlorine substituents in the nucleus thereof and including meta-, ortho- or para-chlorostyrenes, 2,5-, 2,4- and 1,2-dichlorostyrenes, etc., acrylic acid, acrylic and methacrylic esters, such as ethyl acrylate, methyl acrylate, methyl methacrylate, etc., dimethyl-vinylethynylcarbonyl, vinyl pyridine, and even the lower olefin hydrocarbons, such as isobutylene. Other materials, including methacrylylurea and vinyl ketones, substituted vinyl ketones, unsaturated, low molecular weight acids, such as fumaric acid, crotonic acid, their esters and amides, with or without polyhydric alcohols, mixtures of vinyl amide and phthalic anhydride or vinyl phthalamide, etc. may also be present in the monomeric mixture to modify the properties of the polymer.

It is, of course, understood that the separate ingredients of these complex rubbers, such as the dienes or the copolymerizable unsaturated compounds, may by themselves be partially but incompletely polymerized before being mixed with the other monomers without departing from the invention. Such partially polymerized dienes and olefins are herein designated and included by designating their respective monomeric substances.

It is to be noted that both the disperse phase and the matrix composition of the vulcanized articles of the present invention have properties of the general characteristic of soft vulcanized rubber. The variations in the respective proportions and number of the monomeric materials necessary for the attainment of such properties in the copolymer are almost infinite. It is well-known or apparent to those skilled in the art that one copolymerizable material may be substituted in whole or in part by another or by two or more others to obtain improvements in two or more specific properties. The total amount of conjugated dienes should usually constitute a major proportion (at least 50%) of the mixture of polymerizable unsaturated materials used in forming polymers. However, in some instances, as in the case of methylacrylate, etc. when the copolymerizable, unsaturated material alone produces on polymerization a relatively soft polymer, vulcanizable rubbery materials are obtained with a somewhat smaller amount (only 20% or 25%) of conjugated dienes, and in the case of Butyl rubber the amount of conjugated diene may be as low as 1% or even less to give the desired vulcanizability. It is generally preferred that the copolymerizable unsaturated materials be present in amounts between 10% and 40 or 45% of the monomeric mixture, the characteristics of copolymers of these materials and the effect of variations in quantities being well-known to those skilled in the art.

Although rubbery copolymers prepared from monomers containing conjugated dienes are preferred as the disperse phase and a highly flexible compound such as a carbon black-reinforced Hevea rubber or Butyl rubber compound is preferred as the matrix or continuous phase, the present invention is not restricted to any particular type of rubbery polymer for either the disperse phase or the matrix compound. It is applicable to an infinite variety of rubbery polymers so long as these rubbery polymers are obtainable in the vulcanized and vulcanizable states. It may be desirable to vary the proportions of the polymerizable materials in the monomers used for preparing the rubbery polymers or to substitute the polymerizable materials by other polymerizable materials as they become available. The proportions and the number of ingredients polymerizable to a rubbery mass will be apparent to those skilled in the art.

The present invention applies not only to such polymerizable ingredients as may be known at the present time, but also to those which may be hereafter produced and are polymerizable to rubbery polymers. The polymers should, however, preferably be of the type which are vulcanizable either with sulfur or other agents capable of converting the material, with or without heat, from the plastic to the elastic state. Even rubbery products produced by condensation (rubbery condensation polymers), such for example as certain rubbery reaction products of dibasic acids, e. g. sebacic acid, with glycols, diamines and the like, especially when such rubbery polymers are vulcanizable by suitable cross-linking compounds, as well as vulcanizable olefin polysulfides, or "Thiokol" type rubbers, or copolymeric olefin polysulfides, may be used for some applications as the matrix of the compound or in finely divided form as the disperse phase of the compounds of the present invention. It is thus seen that the term "vulcanizable synthetic rubberlike material" as used herein in its broadest scope is entitled to include sulfur-vulcanizable synthetic rubbers, as well as other synthetic vulcanizable materials of a rubbery resilience characteristically resembling after vulcanization a soft vulcanized natural rubber.

Although halogen-substituted dienes, such for example as chloroprene (chloro-2-butadiene-1,3) do not polymerize into a rubber generally considered capable of being reinforced by carbon black, the latter material does stiffen and improve the characteristics of polychloroprene compounds. These haloprenes, particularly chloroprene, are advantageous, however, in that they may be polymerized directly to the vulcanized or cured state without the addition of curing agents.

The matrix or continuous phase portion of the mix may be any compound vulcanizable to a soft, flexible rubbery state similar to soft vulcanized rubber. It is preferably compounded with substantial amounts of carbon black and compounds generally similar to those heretofore used for preparing tire treads and containing the usual compounding ingredients, such as curing agents, pigments, activators, plasticizers, stearic acid, antioxidants, accelerators, etc. are usually used. The vulcanizing agents may be present in sufficient quantity to effect the desired curing of the disperse phase or, if desired, the disperse phase may even be at least partially vulcanized to an elastic state prior to forming the heterogeneous mixture.

Superior results may be obtained when the rubbery binding material of the matrix is plasticized, wholly or partly, with a polymerizable liquid or semi-solid which is capable of being further polymerized preferably to a rubbery polymer. Such a polymerizable material by further polymerization in the matrix tends to greatly strengthen the bond between the dispersed globules and the matrix compound, so that the globules are firmly in the matrix and are not readily displaced or removed bodily by abrasion.

The polymerizable liquid plasticizers preferably used may be prepared by partially polymerizing one or more suitable monomeric materials, partial polymers, or mixtures thereof, etc. to obtain a relatively non-volatile polymer which may be a relatively syrupy, gellike or viscous liquid, or a highly plastic solid, or a mixture of such liquids and/or solids. It may be mixed with carbon black prior to its admixture with ingredients forming the matrix. Thus, for example, it may be prepared by partly condensing an alkylphenol, for example, tertiary butylphenol with an aldehyde such as formaldehyde or butyral aldehyde, etc., in alkaline solution to produce a liquid resol or in acid medium to produce a novolak type in which case the presence of hexamethylenetetramine is desirable, or it may be prepared by polymerizing butadiene or other polymerizable material, or a mixture of carbon black and butadiene, homologues and/or analogues thereof, with or without a copolymerizable unsaturated material, until the latter is a relatively non-volatile liquid or a liquid of a syrupy consistency, as illustrated in Example 1 of British Patent 328,812 of May 8, 1930. To insure the strongest bond between the disperse phase and the matrix, the predominant plasticizer is preferably a liquid polymerizable to a rubberlike polymer of the same type as that in the disperse phase. Plasticizers prepared from a fluid containing the same monomers as utilized in preparing the disperse phase are especially desired.

The polymerizable syrupy or pasty plasticizer should also preferably be compatible with the rubbery material of the matrix compound. When syrupy partial polymers or plasticizers prepared from a monomeric mixture of the same composition as was utilized in preparing a disperse phase are not compatible with the matrix, modification of the plasticizer by changing the proportions of monomers used in preparing it is desirable to insure at least partial miscibility with the rubber of the matrix compound. Thus, when it is desired to utilize a natural rubber as the main rubbery base of the matrix composition and to utilize as a disperse rubbery phase a rubbery copolymer of butadiene and acrylonitrile prepared from monomers having a relatively large proportion of acrylonitrile, it is preferred to utilize as a plasticizer a syrupy or highly plastic copolymer having a sufficiently smaller amount of acrylonitrile to be compatible with natural rubber in the amounts used. The plasticizer is thus seen to be intermediate in hydrocarbon content between the rubber of the matrix and the dispersed rubbery material.

The degree of compatibility with monomer or partial polymers and the matrix compound may usually be readily tested by preparing a dilute cement of the rubber of the matrix compound and incorporating the plasticizer therewith. The amount required to produce salting out of the rubber may be deemed a measure of the degree of compatibility.

If it is desirable in preparing articles to make an entire article of a suitably compounded, soft, vulcanized synthetic rubber, the matrix may consist essentially or entirely of materials polymerizable to a vulcanized synthetic rubber together with the desired compounding agents. For example, a compound of the present invention may be prepared by forming an intimate mixture (with or without finely divided carbon) of jelly or plastic mass of a type polymerizable to a vulcanized or vulcanizable rubber and a rubber powder or finely divided, vulcanizable or even a soft, vulcanized synthetic rubber together with suitable compounding and vulcanizing agents. Thus, a partial polymer of a mixture of butadiene and styrene, viscous polychloroprene, etc. adapted to be polymerized to a rubbery polymer may be used as the matrix composition to obtain some of the benefits of the present invention.

In preparing the heterogeneous mixtures of the present invention from solid rubbers, the matrix composition may be first prepared in a relatively highly plastic state. This may be done either by a relatively large amount of mastication or, preferably, by the addition of a substantial amount of plasticizer with or without mastication, as above described. The relatively more elastic or harder rubber compound or powder which is to constitute the disperse phase may then be mixed or masticated a little at a time into the plastic matrix composition. Because of the difference in elasticity or hardness between the matrix compound and the finely divided rubber powder, the latter may be dispersed uniformly within the matrix without any appreciable mastication or destruction of its inherent abrasion resistance.

The plastic heterogeneous mix prepared above may be shaped in the desired form by conventional rubber machinery, for example it may be extruded, calendered or molded in a form suitable for tire treads or to form a central portion of composite treads which may be prepared according to the methods and/or shapes described in Lehman Patent 2,096,362, Bowers Patent 2,230,072, etc., if desired. Since the matrix composition is more plastic, the shaping and mixing operations do not deteriorate the natural abrasion resistance of the desired compound. The compound may be cured or vulcanized with the aid of heat and pressure to the elastic state, generally characteristic of soft vulcanized rubber.

The amount of carbon black is preferably substantially in excess of 10 or 15 parts per 100 parts of rubberlike material in the matrix composition and about 20 to 35 parts are usually preferred. It is usually desired that the amount of carbon black be substantially less than 50 parts, and a matrix containing no carbon black added as such is sometimes desirable. The disperse phase preferably contains larger amounts of carbon black than does the matrix and 40 or 50 parts, up to 100 parts or so, of carbon black in the disperse phase to 100 parts of rubber is preferred. When the amount of carbon black is substantially greater than 100 parts per 100 parts of the rubbery base of the compound, the product tends to be impaired and a crumbly mass may even be obtained. The carbon blacks preferred in the disperse phase are those types which when mixed with rubber gives a high abrasion resistance (which also is generally accompanied by higher heat build-up) than does the black in the matrix.

A channel black such as easy processing, medium processing or even conductive channel or a mixture of one or more blacks, including one or more channel blacks in substantial proportion, is desirable in the disperse phase as such types of black are found to give superior wear resistance, whereas in contradistinction the black in the matrix is preferably one which gives relatively low heat build-up, greater tubing rate, lower torsional hysteresis and a lower viscosity for equivalent loadings. Examples of such blacks are high modulus furnace blacks, for example Philblack, Kosmos 40, a semi-reinforcing furnace black or a thermo-black, such as P-33 or Thermax to give relatively low heat build-up in the tire tread and to provide improved crack resistance.

It is not usually possible to incorporate more than 70 parts of carbon black in the disperse phase by mastication on a rubber mill without undesirably deteriorating the rubbery base. However, the carbon black may readily be added to latex as a slurry in quantities sufficient to provide 100 to 110 or 115 parts of carbon black for each 100 parts of a rubbery material. When the carbon black is incorporated in latex, however, in amounts in excess of 20 or 30 parts per 100 parts of rubbery material, it is usually desirable that the coagulum be subject to a small amount of shearing or deforming treatment prior to complete drying for the reason that the carbon black upon coagulation in the latex-carbon black mixture tends to form agglomerates of unduly high concentrations of carbon black. The shearing treatment of the agglomerate may be after partial drying, if desired, but water should ordinarily be present in amounts of at least .5% or 1%, based on the rubber of the mixture, and the shearing of the undried coagulum between surfaces at different speeds may be before drying, as may be accomplished in a pelletizer, utilizing extrusion through an orifice or on a rubber mill if preferred.

A proportion of the higher loaded less plastic polymer within the heterogeneous compounds of the present invention may be varied to obtain the desired properties for the intended use. The proportion should not be so large that the particles cannot be bound together by the more plastic matrix compound. The greatest abrasion resistance is usually obtained when the amount of the matrix is just sufficient to fill the spaces between the separate particles of comminuted materials which are packed together or substantially in contact. Generally, the amount of disperse phase is equal to or greater than the amount of the matrix, but compounds in which the disperse phase varies from 20 or 30% to 80 or 85%, by weight, of the heterogeneous compounds are desirable for commercial use.

The following examples, in which parts are by weight, illustrate the present invention.

*Example 1*

To form a rubber compound for the disperse portion of a heterogeneous compound, 80 parts of medium processing channel black, 5 parts of zinc oxide, and about ½ part of sulfur are dispersed in about 400 parts of water and about 10 parts of Daxad (condensation product of formaldehyde and naphthalene sulfonic acid) by passing the aqueous carbon black mixture through a colloid mill. The carbon black mixture thus formed is incorporated into about 400 parts of GR-S latex containing about 25% of rubber solids. The mixture thus produced is coagulated in conventional manner with salt and acetic acid to produce a fine crumb, which is filtered from most of the excess water, passed through fine orifices of a pelletizing tuber to cause smearing of the black and formation of small pellets. The pellets are then dried to about 5% moisture content. Samples when compacted have a Mooney viscosity somewhat above 80, a Williams viscosity around 440, and a reading of about 4.5 on the extrusion (Dillon) plastometer.

To form a matrix compound, a homogeneous mix of the following ingredients is prepared:

| | Parts |
|---|---|
| Smoked sheet | 100 |
| Pine tar | 3 |
| Stearic acid | 4 |
| Antioxidant | 1 |
| Zinc oxide | 10 |
| HMS carbon black | 20 |
| Sulfur | 3 |
| Captax | 1½ |
| Plasticizer | 15 |

(Butadiene-styrene 70:30 ratio, only partially polymerized and having a viscous syrupy-to-highly plastic solid, Mooney plastometer reading of 10 or less.)

The rubber is sufficiently broken down to band on a mill in the usual manner and plasticized by the pine tar and the syrupy polymer, added a little at a time in the usual manner, or if desired the syrupy material is first mixed with the carbon black and incorporated into the rubber simultaneously therewith. The other ingredients are added in the ordinary manner. The Mooney viscosity of the mix is less than 30, corresponding to an extrusion rate of about 1 second on the extrusion (Dillon) plastometer.

With the mill rolls separated just sufficiently to form a small bank of rubber, the pellets previously prepared are added a little at a time to the bank of rubber and by the mastication caused to be enveloped in the mass of the matrix compound to form what may be designated as a rough mix. As the pellets disappear, more are added, until about equal parts by weight of the pellets and the matrix compound are present. Half of the compound thus formed is removed from the rolls and the mill rolls then brought considerably closer together to insure break-up of the particles into a finely divided state. After, the batch on the mill is removed and shaped by extruding, calendering or the like to a form desirable for tire treads. It then may be applied to the tires to provide high abrasion resistance coupled with relatively low running temperatures. After removal of the first batch from the mill, a second batch may be similarly milled to insure the presence of only relatively fine particles of the disperse phase. The mass is distinguishable from a homogeneous mix by microscopic examination and to some observers by visual observation of a film stretched over a light source.

*Example 2*

The crumb of the preceding example is dried to about 5% moisture content and sheeted through a mill to smear the black. Ribbons cut from the sheets are fed slowly or in small increments (compared to the mass of the matrix compound) to the bank of the afore-mentioned highly plastic matrix compound on the mill in place of the pellets of Example 1. Substantially equal results are obtained.

*Example 3*

A dispersion of about 35 parts of easy processing channel black, 30 parts medium processing channel black, 5 parts of high modulus furnace black, 1 part of an accelerator (Captax), and 5 parts of zinc oxide in about 100 parts of GR-S is made by preparing a dispersion or slurry of carbon black in about 350 parts of water and about 5 or 10 parts of quebracho, mixing the carbon black dispersion thus prepared into about 400 parts of GR-S latex containing about 25% of rubber solids, all as in Example 1, coagulating the mixture, sheeting out the coagulum between rolls, and drying to about 1% moisture content or so. Samples of the dried coagulum after slight mastication have a Mooney viscosity in the neighborhood of 80 and an extrusion time of about 4.2 seconds on the Firestone (Dillon) extrusion plastometer after only a slight mastication. The compound is sheeted and cut in the form of a narrow ribbon for addition to a portion of the more plastic matrix compound prepared of the following ingredients, substantially as described in Example 1:

| | Parts |
|---|---|
| Smoked sheet | 100 |
| Pine tar | 5 |
| Stearic acid | 5 |
| Antioxidant | 1 |
| Zinc oxide | 10 |
| Semi-reinforcing furnace black | 25 |
| Sulfur | 4 |
| Captax | 1 |

The heterogeneous compound is prepared by slowly adding to two-thirds of the above matrix compound all of the above highly loaded channel black compound, which has not been masticated an appreciable amount, to cause deterioration of the rubbery base. The ribbon of the highly loaded compound is distributed slowly over the bank of rubber matrix compound, taking care that substantially all of the first addition at any point on the mill is enveloped or surrounded by the matrix before subsequent addition is added. After formation of this rough compound, the mill rolls are tightened to insure breaking up of the high carbon compound into small agglomerates of the order of $\frac{1}{16}''$ or less average diameter. The compound thus prepared is readily tubable, even though the high carbon black loaded compound is relatively unbroken-down and has the corresponding high abrasion resistance when cured. Tire treads formed from the compound have relatively low heat build-up, good flexing and cracking resistance, combined with relatively high abrasion resistance compared to homogeneous tire treads.

*Example 4*

When the rough mix of Example 3 is prepared by adding the ribbon of highly loaded carbon black compound in successive increments to the Banbury containing the more plastic heterogeneous compound, and the rough mixture from the Banbury subsequently milled on a relatively tight mill to break up the agglomerates, a compound of very desirable properties is obtained.

*Example 5*

When in Example 1 the GR–S latex is substituted by an equal amount of a latex of a rubbery polymerization product, obtained by polymerizing a liquid mixture of about 20 parts of dichlorostyrene, 10 parts of styrene, and 70 parts of butadiene in emulsion form so as to obtain about 25% rubbery solids, the other steps and ingredients remaining the same, a desirable tire tread is also produced.

*Example 6*

When the natural rubber in the matrix compound of Example 1 is substituted by an equal weight of a sulfur-vulcanizable synthetic rubber, such as GR–S, the sulfur content simultaneously being reduced to about 2 parts, other conditions and the procedure of Example 1 remaining the same, the tire tread produced by extruding the heterogeneous mix and vulcanizing on a tire carcass in a suitable mold has relatively high abrasion resistance but somewhat higher heat build-up than the product of Examples 1 or 3 in which the matrix is a natural rubber.

*Example 7*

The GR–S latex in Example 3 is substituted by natural rubber latex, the HMF carbon black is omitted from the matrix compound, the other conditions remaining the same. A tire tread having even lower heat build-up but still retaining relatively good abrasion resistance is thus obtained.

*Example 8*

The highly loaded carbon black composition for the disperse phase of the heterogeneous compound of Example 3 is substituted by a compound prepared by milling the same proportions of carbon black and other ingredients into solid natural or synthetic rubber sheeted into ribbon form and mixed into the matrix composition. The heterogeneous compound prepared has properties desirable for the preparation of tire treads.

*Example 9*

The uncoagulated, well-dispersed latex-carbon black mixture, identical with that of Example 3, is spray dried in accordance with usual procedure to produce a relatively fine powder, which is added a little at a time to the matrix composition of Example 3. The heterogeneous compound produced has very low heat build-up and has excellent properties.

The matrix composition may be substituted by other rubber compounds or compounds of vulcanizable natural or synthetic rubbers, as above set forth and as set forth in the afore-mentioned prior applications, of which this application is a continuation-in-part.

In the above examples, a rubber or rubbery material of the disperse phase may be substituted by any one rubbery material or by a blend or mixture of one or more rubbery polymers, or even by natural rubber, as above set forth. It is preferably compounded with most or all of the desired compounding and curing agents, as well as carbon black, although it is found that the curing agents may usually be omitted as sufficient migration from the matrix compound in the disperse phase is usually had, particularly if the particles of the disperse phase are less than $\frac{1}{8}''$ or $\frac{1}{16}''$ average diameter, as present in compounds having the more desirable operating characteristics.

An important feature of the heterogeneous compounds of the present invention is the blending of the interface of the disperse and matrix phases, which as afore-mentioned is accomplished both by the softening effect of the matrix phase and the mixing and shearing operations in the composition. This gradual rather than abrupt change in properties in the region of the interface of the two compounds obviously cannot occur to any desirable extent if the disperse phase is vulcanized prior to the addition. Hence, vulcanization of the disperse phase prior to addition yields a product having properties which are much inferior to those of compounds prepared by milling an unvulcanized rubbery compound or powder into a vulcanizable matrix, although such a product has substantial utility.

It will be seen from the above that the disperse phase need not be deteriorated by mastication to permit relatively easy processing of the tread compound as the particles of the disperse phase in shaping operations readily move bodily through the matrix composition which is of relatively lower plasticity. In the case of a homogeneous compound, on the other hand, the mastication or plasticization of the entire compound results in great loss in the wear resistance of the tread, so that many of the desirable features naturally inherent in the rubber are greatly deteriorated by the necessity for the attainment of processing properties in manufacturing operations.

The separate globules of high carbon black loaded rubber stock within the matrix composition when the aforementioned interfacial gradient is present also apparently act as stops to inhibit crack growth, as well as act as the high wear-resistant elements of the composition, so that the tire treads or other articles which may be formed therefrom have high abrasion resistance due to the disperse phase and relatively low heat build-up due to the matrix composition.

The term "polymer of a diolefinic compound" in the appended claims is used in the generic sense to include copolymers of a diolefinic compound with other polymerizable materials as well as solids obtained by polymerizing a liquid consisting of a diolefinic compound alone.

It is to be understood that variations and modifications of the specific products and processes herein shown and described for purposes of illustration may be made without departing from the spirit of the invention.

What I claim is:

1. A method of preparing a plastic heterogeneous compound for the production of tire treads and the like which comprises incorporating carbon black into a latex of a vulcanizable water-insoluble polymer, coagulating the mixture thus obtained to form a plastic compound having a base of said polymer and containing substantial amounts of carbon black, separately forming a continuous phase of more plastic matrix compound having a base of a vulcanizable water-insoluble polymeric material and also capable of being vulcanized to a soft rubbery state, dispersing particles of the separately mixed less plastic compound into a continuous phase of said more plastic matrix compound, and masticating the resultant mix to cause blending of the interface between particles of the less plastic compound and said matrix compound, both of said compounds when vulcanized being characteristic of a soft vulcanized, as distinguished from a hard vulcanized, rubber compound, the amount of carbon blacks present in the less plastic of said compounds being greater than the amount in said more plastic compound, said polymer and said polymeric material being selected from members of the group consisting of plastic natural rubber and polymers of a conjugated diolefinic compound having less than 8 carbon atoms, the difference between plasticities of said compounds being at least 20 points on a Mooney plastometer.

2. A method of making a plastic, vulcanizable compound suitable for preparing articles having portions with a flexibility generally characteristic of soft, vulcanized rubber compounds which comprises preparing a matrix compound of a vulcanizable, water-insoluble polymeric material in a plastic form, and incorporating in a continuous phase of said vulcanizable matrix compound, a little at a time compared to the amount of said matrix compound and at insufficient rate to form said less plastic polymer into a continuous phase, a substantial proportion of a less plastic, compounded, vulcanizable, water-insoluble polymer, which compounded polymer while plastic has a Mooney plasticity reading of at least twenty points more than the Mooney plasticity reading of said matrix, said incorporation being accomplished by adding said less plastic polymer to a continuous phase of said more plastic matrix compound while the latter is being masticated, and masticating the materials together to form a mixture, whereby discrete particles of said polymer are distributed as discrete particles in said matrix and an interface of intermediate composition is formed by mingling of said polymer particles and said matrix, said polymer and said polymeric material being selected from the group consisting of plastic natural rubber and plastic vulcanizable polymerization products of a material comprising a polymerizable diolefinic compound of less than 8 carbon atoms, said polymer and said polymeric material having different compositions.

3. A method of making a plastic vulcanizable compound suitable for forming rubberlike articles having high abrasion resistance, which comprises masticating a rubber compound to increase its plasticity, and then gradually incorporating in a continuous phase of said compound a carbon black stiffened, homogeneous masticated plastic rubbery polymerization product of a mixture comprising butadiene and styrene, said carbon black stiffened rubber polymerization product having when mixed with said rubber compound, a Mooney plasticity reading of at least 20 points more than the Mooney plasticity reading of said rubber compound said incorporation being accomplished by adding said carbon black stiffened plastic polymerization product to a continuous phase of said matrix compound during the mastication of the latter and at a rate insufficient to form said added compound into a continuous phase, whereby the less plastic polymerization product is broken up and dispersed as particles through said matrix and an interface of graduated and intermediate physical properties is formed between said matrix and said particles by blending of material from the surface regions only of said particles with material of said matrix by mastication.

4. A method of making a plastic rubbery compound suitable for the production of tire treads and the like, having when vulcanized flexibility generally characteristic of tire tread compounds, which comprises preparing a relatively plastic masticated matrix of a vulcanizable water-insoluble rubber compound, preparing a separate homogenous masticated mixture of carbon black and a rubbery polymer of a conjugated diolefinic compound, which mixture is substantially less plastic than is said matrix compound and has a "Mooney" plasticity reading of at least 10 points more than said matrix compound, forming a rough compound containing said pieces of less plastic homogenous mixture heterogeneously distributed through said matrix compound by adding pieces or pellets of said less plastic compound to a continuous phase of said matrix, the rate of addition of said pieces or pellets being such that they are masticated into said matrix but being insufficient to form them into a continuous phase displacing said matrix, and thereafter milling said rough compound to break up said pieces or particles into smaller pieces or particles and to form an interfacial region of graduated and intermediate hardness therebetween.

THEODORE A. TE GROTENHUIS.

References Cited in the file of this patent

UNITED STATES PATENTS

| Number | Name | Date |
|---|---|---|
| 1,558,688 | Loomis et al. | Oct. 27, 1925 |
| 1,611,278 | Petersen | Dec. 21, 1926 |

(Other references on following page)

UNITED STATES PATENTS

| Number | Name | Date |
|---|---|---|
| 1,952,041 | Murphy | Mar. 20, 1934 |
| 1,973,748 | Caldwell | Sept. 18, 1934 |
| 1,994,619 | Porritt | Mar. 19, 1935 |
| 2,053,530 | Nobel | Sept. 8, 1936 |
| 2,239,659 | Bradley | Apr. 22, 1941 |
| 2,259,349 | Merrill | Oct. 14, 1941 |
| 2,277,259 | Schnabel | Mar. 24, 1942 |
| 2,354,424 | Novotny et al. | July 25, 1944 |
| 2,378,717 | Macey | June 19, 1945 |
| 2,386,583 | Bacon | Oct. 9, 1945 |
| 2,457,097 | Te Grotenhuis | Dec. 21, 1948 |

FOREIGN PATENTS

| Number | Country | Date |
|---|---|---|
| 328,812 | Great Britain | May 8, 1930 |
| 492,998 | Great Britain | Sept. 30, 1938 |

OTHER REFERENCES

Davey, Jour. Soc. Chem. Ind., p. 515T to 517T, November 13, 1925.